(12) United States Patent
Hammer

(10) Patent No.: US 8,776,599 B2
(45) Date of Patent: Jul. 15, 2014

(54) MICRO GYROSCOPE FOR DETERMINING ROTATIONAL MOVEMENTS ABOUT THREE SPATIAL AXES WHICH ARE PERPENDICULAR TO ONE ANOTHER

(75) Inventor: Hanno Hammer, Graz-Lebring (AT)

(73) Assignee: Maxim Integrated Products, Inc., San Jose, CA (US)

( * ) Notice: Subject to any disclaimer, the term of this patent is extended or adjusted under 35 U.S.C. 154(b) by 208 days.

(21) Appl. No.: 13/258,177

(22) PCT Filed: Mar. 8, 2010

(86) PCT No.: PCT/EP2010/052880
§ 371 (c)(1),
(2), (4) Date: Sep. 21, 2011

(87) PCT Pub. No.: WO2010/108773
PCT Pub. Date: Sep. 30, 2010

(65) Prior Publication Data
US 2012/0024056 A1 Feb. 2, 2012

(30) Foreign Application Priority Data
Mar. 26, 2009 (DE) .......................... 10 2009 001 922

(51) Int. Cl.
*G01P 15/14* (2013.01)
(52) U.S. Cl.
USPC ...................................................... 73/504.02
(58) Field of Classification Search
USPC ...................................................... 73/504.02
See application file for complete search history.

(56) References Cited

U.S. PATENT DOCUMENTS

2002/0088279 A1   7/2002 Folkmer

FOREIGN PATENT DOCUMENTS

| CN | 1782713 A | 7/2006 |
| EP | 1832841 A1 * | 9/2007 |
| JP | H07-091958 | 4/1995 |
| JP | H11-183179 | 7/1999 |
| JP | H11-325905 | 11/1999 |
| JP | 2000-180174 | 6/2000 |
| JP | 2000-180177 | 6/2000 |
| JP | 2000-509812 | 8/2000 |

(Continued)

OTHER PUBLICATIONS

International Search Report for Co-Pending PCT Application No. PCT/EP2010/052880.

(Continued)

*Primary Examiner* — Hezron E Williams
*Assistant Examiner* — Gregory J Redmann
(74) *Attorney, Agent, or Firm* — North Weber & Baugh LLP

(57) ABSTRACT

A micro gyroscope determine three-dimensional rotational movements is mounted on a substrate on which a plurality of masses tangentially oscillate about the z axis perpendicular to the substrate. The oscillating masses are fastened to the substrate by springs and bolts. Driving elements maintain oscillating tangential vibrations of the masses about the z axis. Upon rotation of the substrate about any spatial axis, the masses are subjected to deflections caused by Corolis forces that are detected by sensor elements. Certain masses oscillating about the z axis are tiltable about the x axis, while some others are tiltable about the y axis. At least one other mass is configured to deflect radially to the z axis in a x-y plane parallel to the plane of the substrate. This mass is assigned a sensor element that can deflect radially with respect to the axis but cannot oscillate about the z axis.

1 Claim, 8 Drawing Sheets

(56) References Cited

FOREIGN PATENT DOCUMENTS

Figure 1:
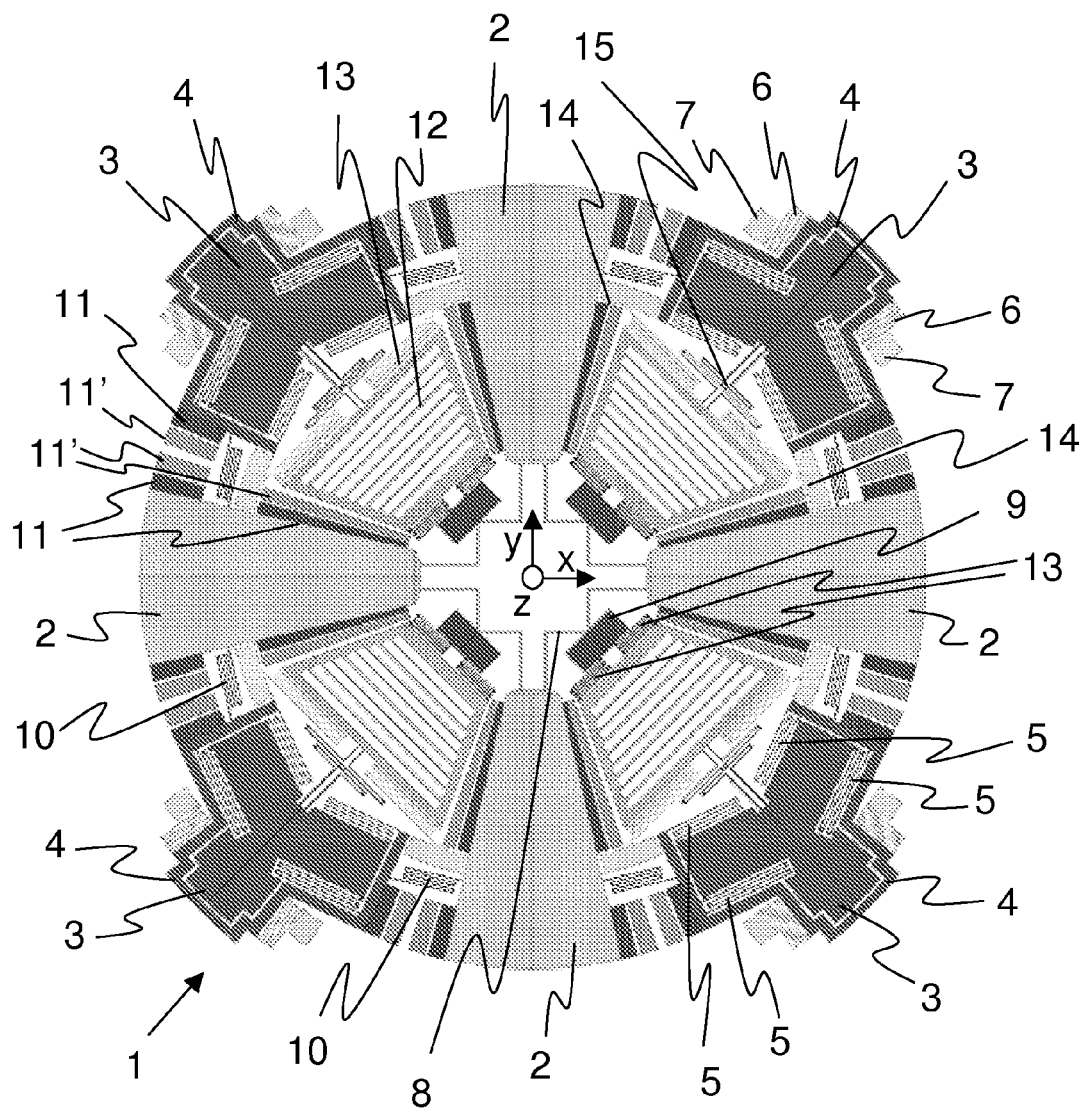

| | | |
|---|---|---|
| JP | 2002-148048 | 5/2002 |
| JP | 2006-153798 | 6/2006 |
| JP | 2007-271611 | 10/2007 |
| JP | 2012-519270 | 8/2012 |
| WO | WO2008/051677 A2 | 5/2008 |

OTHER PUBLICATIONS

Office Action of Nov. 16, 2013, in corresponding Chinese Patent Application No. 201080013525.9.

Office Action of Jan. 7, 2014, in corresponding Japanese Patent Application No. 2012-501228.

\* cited by examiner

MICRO GYROSCOPE FOR DETERMINING ROTATIONAL MOVEMENTS ABOUT THREE SPATIAL AXES WHICH ARE PERPENDICULAR TO ONE ANOTHER

This invention refers to a micro gyroscope for determining rotational movements about three perpendicularly stacked spatial axes x, y and z with a substrate on which several tangentially oscillating masses are arranged about the z axis perpendicularly standing on the substrate, whereby the oscillating masses are fastened to the substrate with springs and tie bolts and have drive elements for maintaining the oscillating tangential vibrations of the masses about the z axis, as a result of which the masses are subject to Coriolis forces and the deflections caused by them when the substrate rotates around any spatial axis, and with sensor elements for determining the deflection of the masses owing to the generated Coriolis forces.

In an x-y-z coordinate system, micro gyroscopes are generally used for determining a rotational movement about an axis. In order to determine the system's rotations about every one of the three axes, three such micro gyroscopes are therefore needed. This is not only very expensive, but it's difficult to control them and process the data.

A triaxial micro electro-mechanical sensor (MEMS) gyroscope is known from TW 286201 BB in which masses are arranged on a central tie bolt and set into an oscillating rotational motion. These masses are arranged on a substrate and tilted about the x or y axis owing to a Coriolis force generated about the y or x axis, something made possible by a corresponding suspension of these drive masses to the substrate. When there is a rotation about the z axis, partial masses can in turn be translationally deflected by their corresponding suspension on the pivoted masses. Both the tilting movements and the translator movement can be determined with sensors, and owing to their proportionality to the substrate's rotation, it can be used as measure for the respective rotation about the x, y or z axis. The corresponding deflections, however, can be determined only with great difficulty.

So a tridimensional gyroscope can be created, in which rotations about all three axes can be determined, D. Wood and collaborators suggested in an article published in 1996 ("A Monolithic Silicon Gyroscope Capable of Sensing about Three Axes Simultaneously") a gyroscope with oscillating masses arranged circularly about a central tie bolt. These masses are capable of executing both tilting and rotational movements owing to the generated Coriolis forces. The disadvantage, however, is that the manufacturing of such a sensor and the actuation of the moved masses are difficult. The movements of the individual sensor components influence each other, so that measurements of the gyroscope movement in x, y or z direction are insufficiently accurate.

The task of this invention is to create a highly accurate micro gyroscope for determining rotational movements about three perpendicularly stacked spatial axes x, y and z for determining the deflections in the individual rotational directions and providing no false readings owing to movements in the directions to be determined and the others, especially not through the actuation of the masses.

The task is solved with a micro gyroscope having the characteristics of claim 1.

The micro gyroscope according to the invention serves for determining rotations about three stacked perpendicular spatial axes x, y and z. It has a substrate on which several tangentially oscillating masses are arranged about the z axis placed perpendicularly on the substrate, whereby the oscillating masses are fastened to the substrate by means of springs and tie bolts. The drive elements move the masses about the z axis and maintain an oscillating tangential vibration of the masses about the z axis. When the substrate is rotating about any spatial axis, Coriolis forces are generated that cause a deflection of the driven masses. Sensor elements are arranged in the area of the masses to register their deflections caused by the Coriolis forces that were generated by the substrate's rotational movement.

According to the invention, some of the masses oscillating about the z axis are arranged essentially in tilted fashion about the x axis running parallel to the substrate. Other masses oscillating about the z axis are also arranged in tilted fashion about the y axis running parallel to the substrate. In addition, at least another one of the oscillating masses can be deflected radially with respect to the z axis, and in the x-y plane parallel to the plane of the substrate. Hereinafter, such masses will be named "z masses". An oscillating sensor element that can also be deflected radially with respect to the z axis, but not about the z axis, is arranged on this z mass that can be additionally deflected radially.

Especially owing to the separation of the z axis from the sensor element, a decoupling of the tangential drive movement from the radial sensor movement can be accomplished very favorably. The sensor element itself is not tangentially actuated; therefore, only the radial movement of the sensor element can be registered to determine a rotation of the substrate about the z axis. The z mass is moved about the z axis together with the other masses and deflected in radial direction when a rotation of the substrate about the z axis occurs due to the resulting Coriolis force generated by this. The z mass then completes both a tangential and radial movement, but only the radial movement is transferred to the sensor element. This sole movement direction of the sensor element in radial direction can be very easily registered without superimposition with other movements. As a result of this, the recording accuracy has been greatly improved compared to the state-of-the-art solutions.

In accordance with an advantageous design of the invention, the gyroscope consists essentially of eight masses oscillating tangentially about the z axis, in which case four of these masses can be additionally moved radially about the z axis and are therefore called z masses. The arrangement of eight oscillating masses from which four are z masses creates a balanced gyroscope with respect to the occurring forces. The Coriolis forces can be registered relatively easy and the respective cause of a rotation about a certain axis can be reliably determined. A particularly balanced system is achieved especially when the eight masses are distributed uniformly along the perimeter and the oscillating masses are oriented essentially only tangentially about the z axis along the x- and y directions and the remaining z masses are arranged between the x and y axes. As all masses participating in the drive movement, the z masses are also driven tangentially about the z axis, but can also be deflected radially to the z axis. These masses are preferably held by semi-open frames and set into the tangential drive movement. The Coriolis force merely affects the z mass mobility in radial direction—thus causing, in turn, the deflection of the sensor element for determining a rotational speed about the z axis.

In a favorable design of the invention, the masses that oscillate largely tangentially about the z axis are tilting plates for registering the substrate's rotation about the x or axis. As soon as a Coriolis force occurs due to the substrate's rotation about the x or y axis, these masses that oscillate only tangentially about the z axis are tilted about the y or x axis. This tilting movement can be converted to electrical signals with capacitive sensors allocated to the masses.

Advantageously, the both radially and tangentially movable z mass about the z axis can be coupled to a frame so it can be set in tangential motion about the z axis. On the one hand, the frame ensures the tangential drive of the z mass and, on the other hand, a stable suspension of the mass so a movement in radial direction can take place. Owing to the special frame design, the z mass can be made sufficiently large so it can show a noticeable reaction to the Coriolis forces and be deflected in radial direction. This design variant shows clearly that the main feature of the z mass is essentially the deflection in radial direction, which on the one hand can occur only when the entire frame and z mass combination is driven tangentially as primary movement. However, the secondary movement in radial direction is especially important here. The frame-like design makes it possible to implement these features very advantageously.

It is especially favorable for the z mass that moves both radially and tangentially about the z axis to be connected to at least another sensor element for registering its radial deflection caused by the Coriolis forces. As a result of this, the deflections do not have to be measured at the z mass itself (which moves both in radial and tangential direction) but the occurring Coriolis forces that cause the z mass to be radially deflected can be registered by the sensor element that moves only in radial direction. This leads to a clear improvement of the measuring results to be registered because there are no superimpositions with other movements. A movement of the sensor element indicates exclusively a Coriolis force in radial direction. The signal registered in this way can therefore be very easily evaluated.

In an advantageous embodiment of the invention, the frame is anchored to the substrate with springs, especially two, that can be tangentially moved about the z axis. Since the frame is essentially stationary in all directions except the tangential one, it is only capable of oscillating in tangential direction. The Coriolis forces acting on the frame cannot deflect it radially. Accordingly, the frame or the springs are thus built stiffly in radial direction. Preferably, the frame does not move out of the x or y plane either, and therefore does not react to the Coriolis forces that occur as a result of the rotational speeds about the x or y axis. The stiffness in this direction, however, is not always required; it can be tolerated for the frame and the z mass to move out of the x-y plane when it is ensured that this movement will not be transferred to the sensor element and affect its measurement.

To obtain a micro gyroscope with a well-balanced system with regard to the reaction forces and reaction torques occurring between the masses being moved, it is better to arrange the frames between the masses oscillating tangentially about the z axis or tilting plates.

The z masses, which can be moved both radially and tangentially about the z axis, are connected to their respective frame with at least one spring, preferably with four springs. This creates a stable arrangement of the z axis within the frame to advantageously ensure that the z mass can be moved only radially relative to the frame. Here, the z mass reacts merely to the rotational speeds about the z axis, eliciting a clear reaction of the sensor element allocated to the z mass and a correspondingly unambiguous measurement result owing to the resulting electric signal.

If in an advantageous design of the invention the frames are anchored to the substrate and can be moved mostly tangentially about the z axis, then the primary movement in the frames can be clearly initiated as a rotation in tangential direction about the z axis in the frame. An oscillation in radial direction of the z mass movably arranged within the frame is the resulting secondary movement.

The dynamic behavior of the micro gyroscope is significantly enhanced when the tilting plates and the frames are connected to one another with springs. These springs act as synchronization springs and cause the primary movement (which takes place tangentially about the z axis) to be executed by the tilting plates and the frame in the same fashion. As a result of this, a common mode of oscillation of the tilting plates and the frame takes place, in which case all masses involved oscillate with equal frequency and phase.

Preferably, the springs (which connect the tilting plates and the frames with each other) are executed stiffly in tangential direction, but non-rigidly in the other directions. Therefore, it is possible for the primary movement occurring in the tilting plates and frames to establish a common mode of oscillation with equal frequency, but the resulting plate tilting out of the x-y plane during an indication of a rotational speed in x or y direction is not impeded by the synchronization springs. Thus, the tilting plates can be largely moved independently out of the frame, remaining preferably on the x-y plane without having a large spring resistance that could counteract this.

For the clear indication of a rotational speed about the x or y axis, it has been advantageously intended for some of the masses or tilting plates oscillating tangentially about the z axis and other masses or tilting plates to be tiltably anchored to the substrate only about the y axis. The masses or tilting plates, which are farther away from the x axis or lie on the y axis and move out of the x-y plane, therefore indicate a rotational speed about the y axis. On the other hand, the masses or tilting plates farther away from the y axis or lying on the x axis indicate, while they tilt about the y axis or when they move out of the x-y axis, a rotational speed of the sensor about the x axis.

Drive elements that initiate the primary oscillation are preferably arranged on the masses that oscillate only tangentially about the z axis and/or on the frame. These drive elements initiate a drive oscillation in the structural parts that is a primary oscillation about the z axis.

In an advantageous design of the invention, the drive elements needed for maintaining the drive oscillation about the z axis are electrodes of comb capacitors equipped with the suitable switching drive voltages. Parts of the drive elements are fastened to the substrate for accomplishing this, other parts are in turn fastened to the structural elements to be driven. When AC voltage is applied, the electrodes are mutually attracted and this generates the oscillating primary oscillation of the structural parts.

Sensor elements are preferably arranged below the tilting plates for registering the deflection of the tilting plates. These sensor elements can be plate capacitors, for example, whose one movable half is executed on the substrate surface by a tilting plate and whose other, static half, by an extended conductor line below the tilting plate. The change of the capacity during the registration of a measured movement brings about a corresponding change of an electrical measured signal.

If sensor elements are allocated to the z masses for registering the radial deflections caused by the Coriolis forces, then the rotational speeds about the sensor's z axis above these sensor elements can be very easily and unmistakably determined.

Preferably, the sensor elements allocated to the z masses consist of movable measuring electrodes of capacitors whose static counterparts are rigidly connected to the substrate. One part of the measuring electrodes therefore also completes the movement of the sensor elements and, when doing this, either approaches or moves away from the static counterparts of the measuring electrodes. This spacing change is converted to a changeable electrical signal, which allows one to draw conclusions about the sensor's rotational speed about the z axis.

The movable measuring electrodes of the sensor elements are preferably executed as frames movable in radial direction. This creates a stable structural element that can reliably signal the movement.

It is especially advantageous for the z masses to be as far away from the sensor's center as possible because a stronger Coriolis force can act on them and consequently they can deliver a larger oscillation amplitude to the allocated sensor element. As a result of this, small rotational speeds can already be measured. In addition, the sensor can nonetheless be built very compactly and with a small surface and deliver clear signals for the corresponding rotational speeds.

To ensure that the sensor element is decoupled as far as possible from the tangential movement of the z mass allocated to it, it has been advantageously intended for the z mass and the sensor element to be connected with springs, a non-rigid one in tangential direction and a stiff one in radial direction. The radial movement of the z mass is thus transferred to the sensor element and both radial oscillations jointly produce the secondary oscillation without the tangential primary movement of the z mass being capable of interconnecting on the sensor element.

So the sensor element allocated to the z mass can be stably arranged, especially to make it resistant to influences acting on directions other than the intended one as well, it is proposed to fasten the sensor element to the substrate by means of (preferably) four springs. In this case, the springs are executed in a way to allow a radial movement of the sensor element but impede movements in other directions as much as possible.

Preferably, the tilting plate is arranged on the substrate with springs that allow a tangential-rotational movement of the tilting plate in the x-y plane and a tilting movement of the tilting plate out of the x-y plane. For this purpose, the springs are preferably fixed close to the center with a tie bolt.

A preferred design of the sensor's basic form is an essentially circular one for its exterior for supporting the rotation of the primary movement and so the sensor can also fit in a very small structural space.

Figure 2:
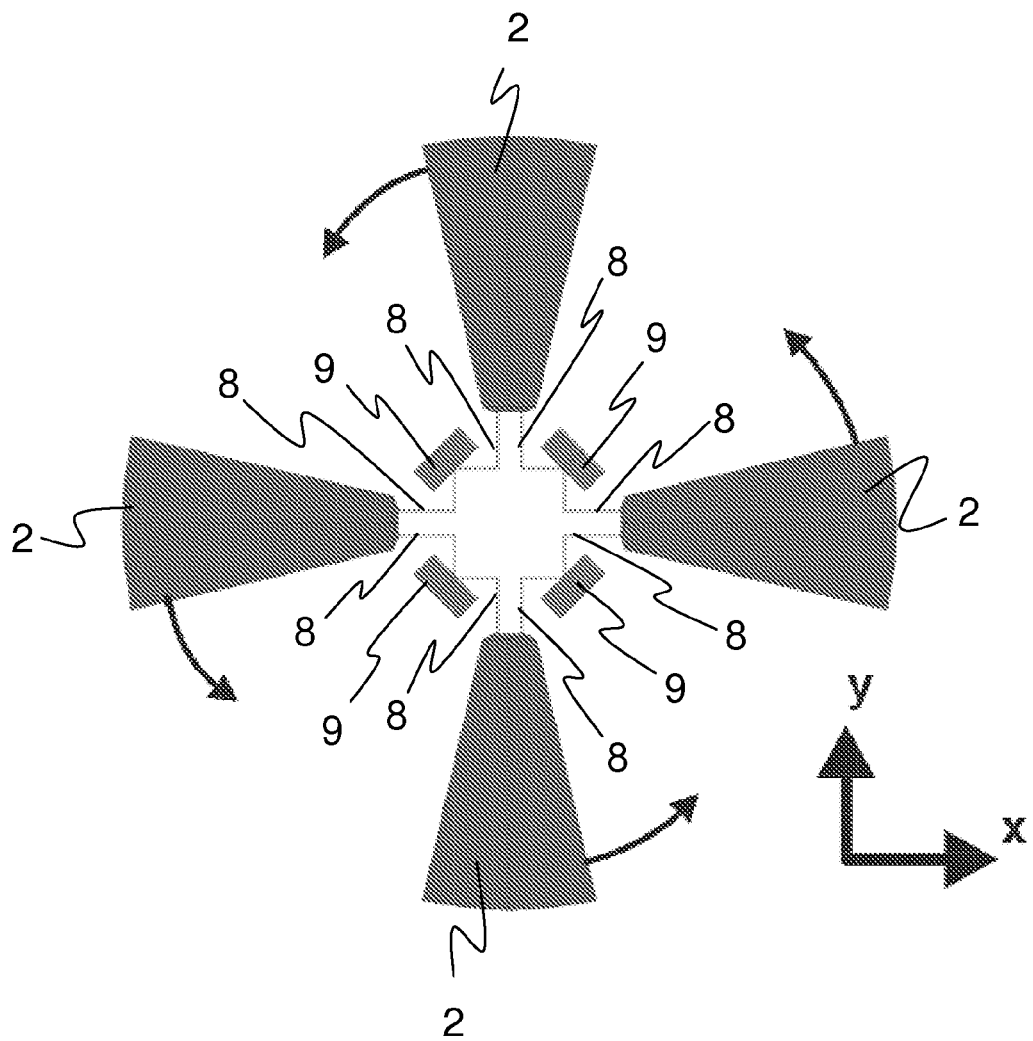
Figure 3:
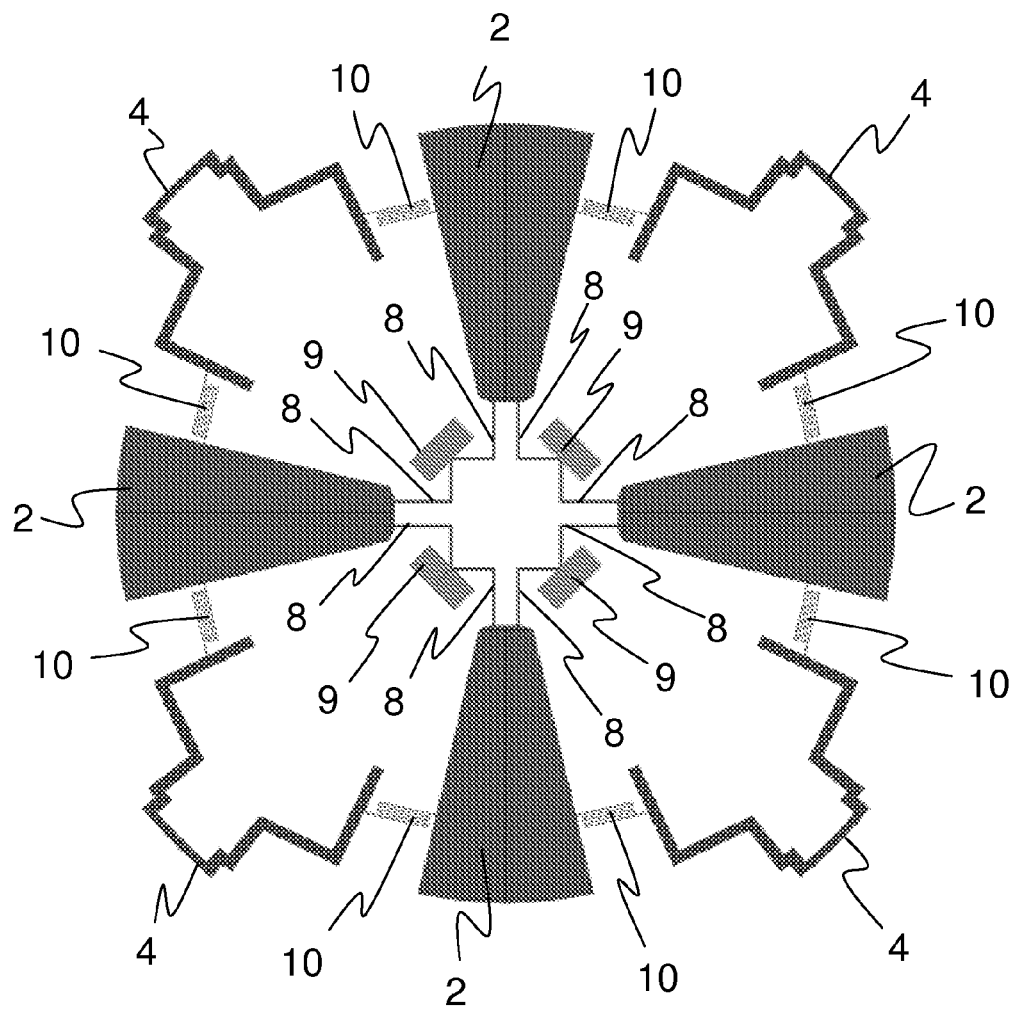
Figure 4:
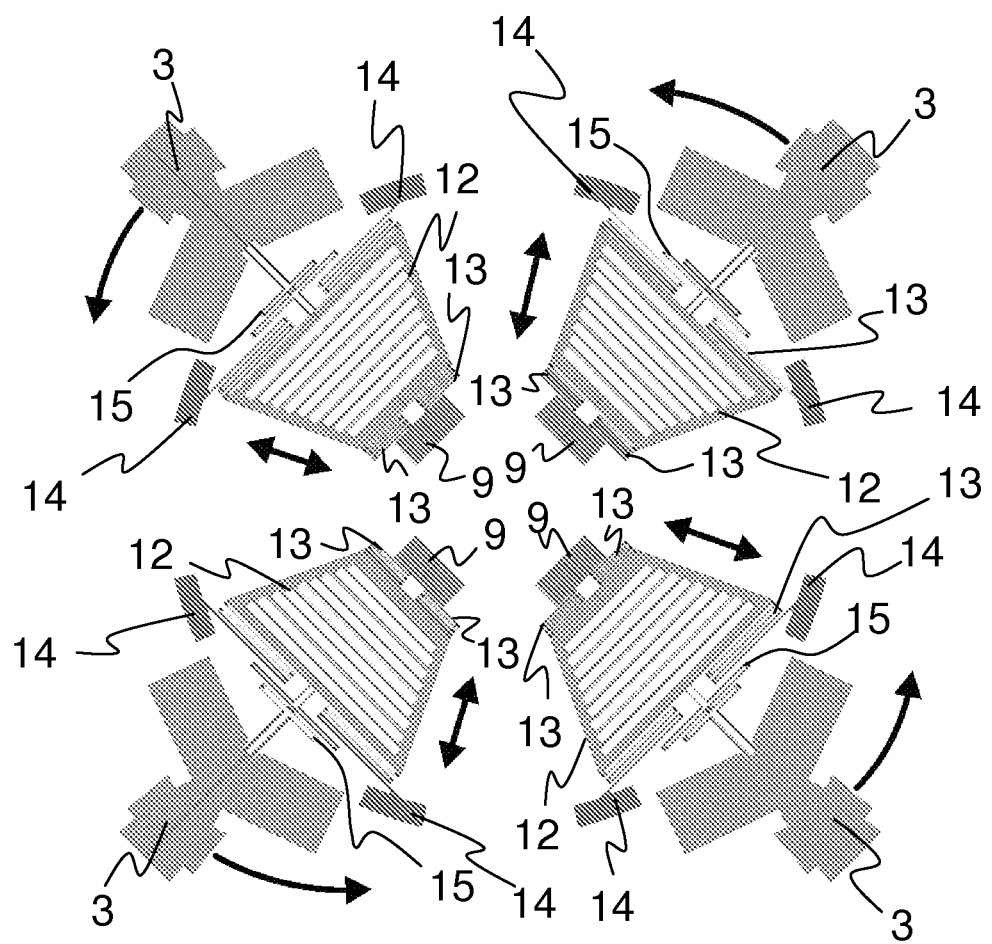
Figure 5:
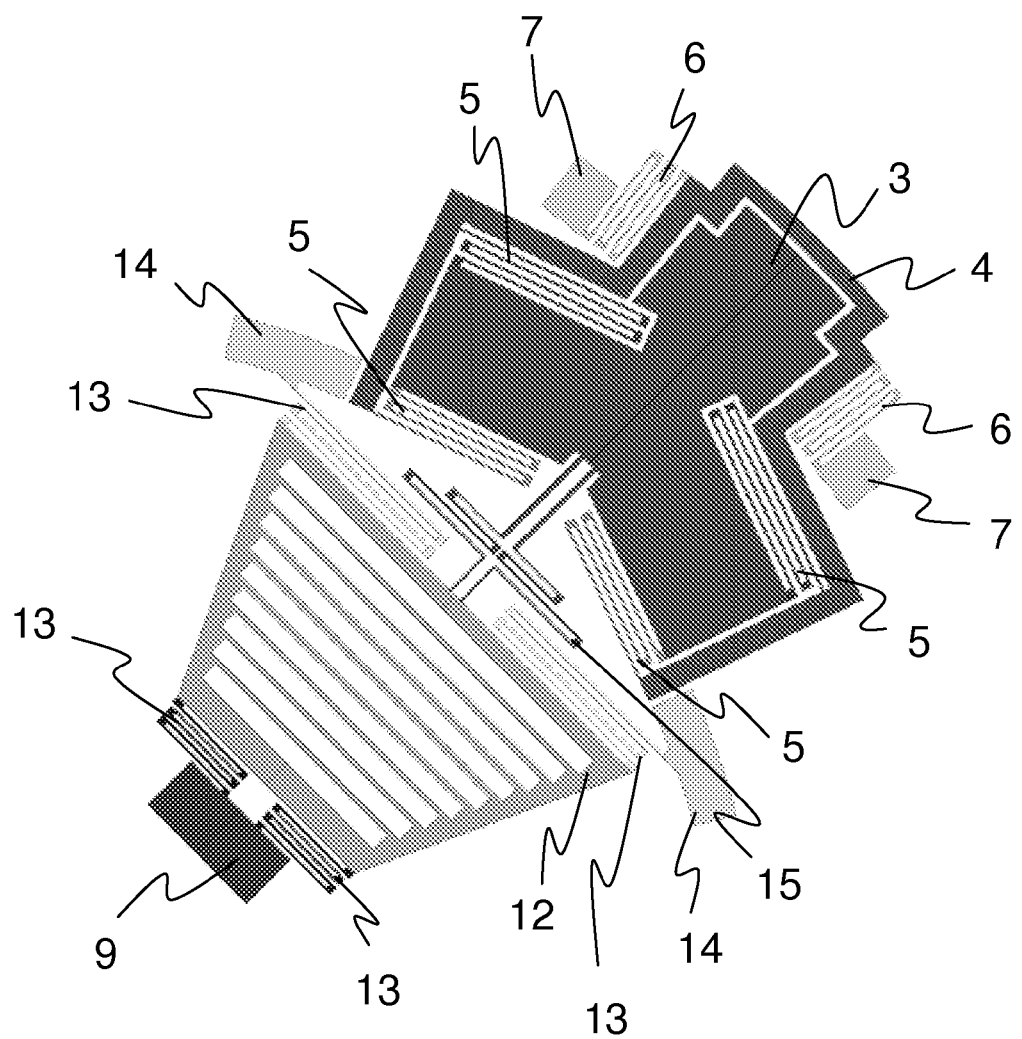
Figure 6:
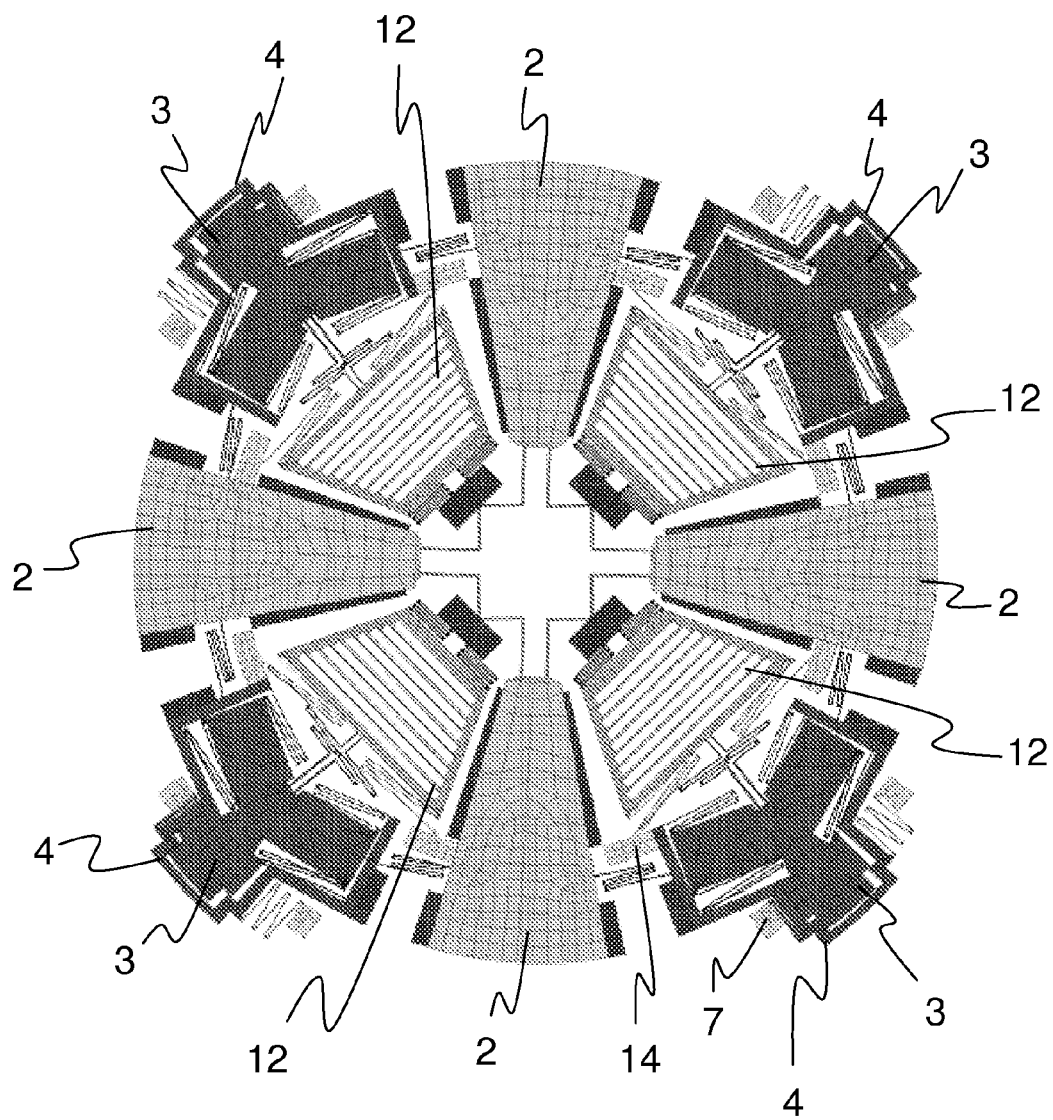
Figure 7:
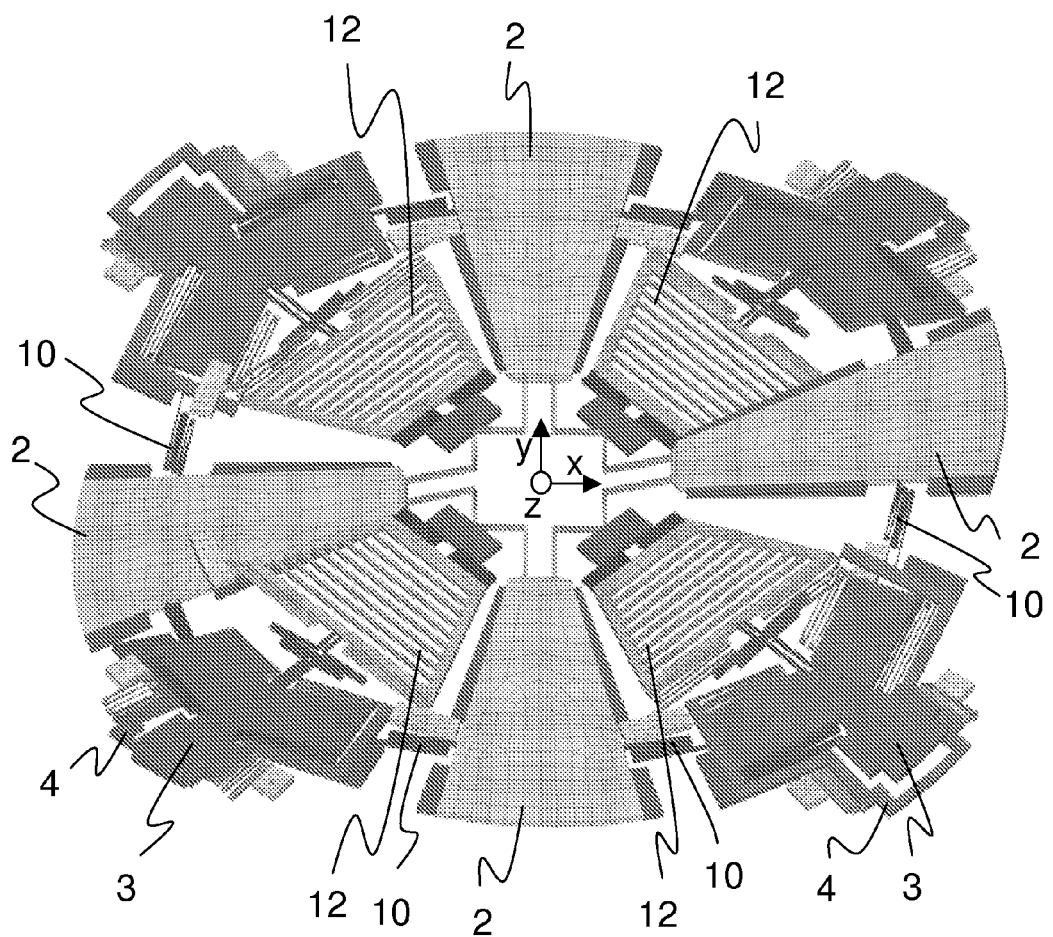
Figure 8:
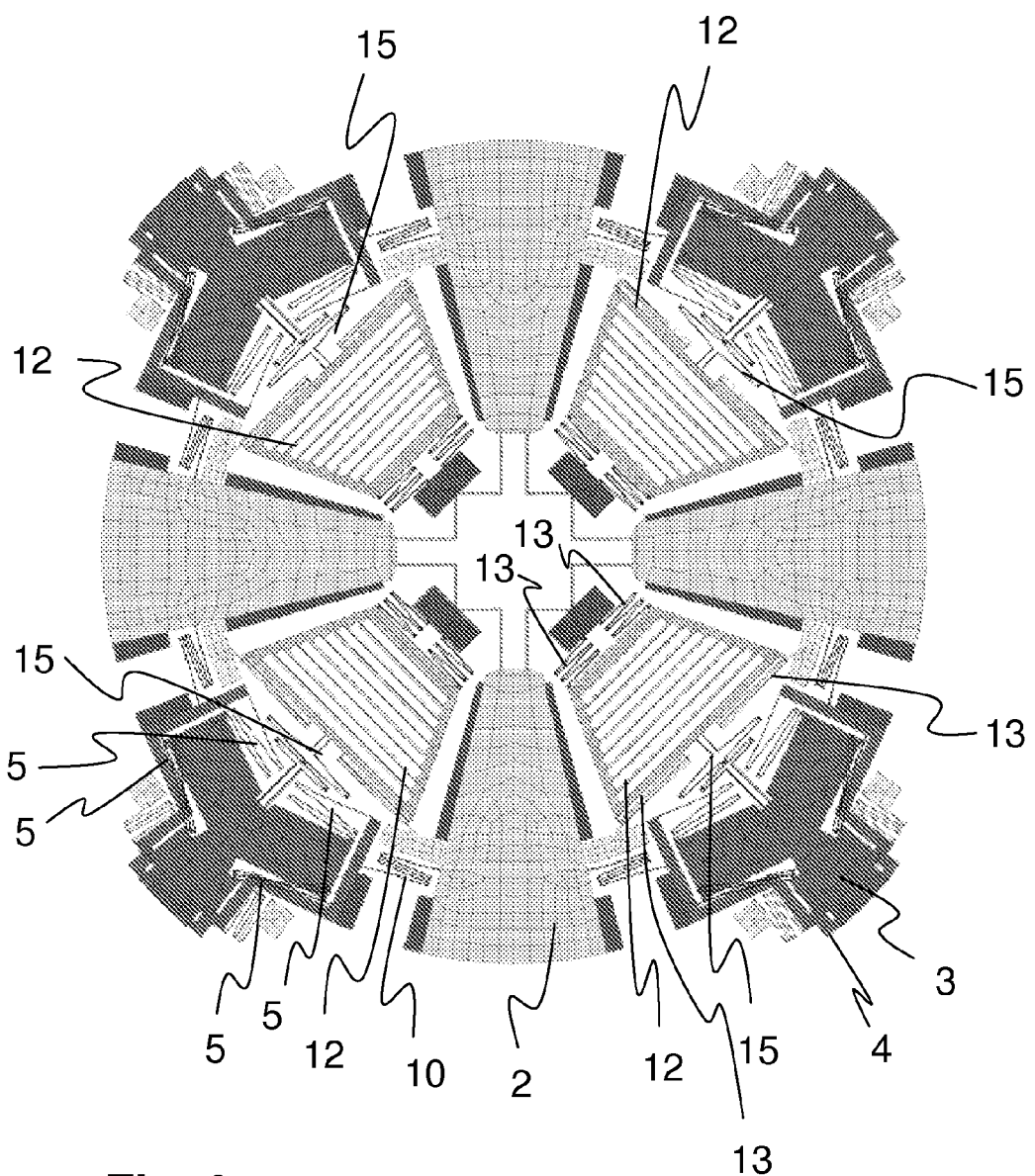

Other advantages of the invention are described with the help of the embodiments shown in the following figures, which show:

FIG. 1 a top view of a gyroscope according to the invention,

FIG. 2 a top view of the tilting plates of the gyroscope according to FIG. 1,

FIG. 3 the connection of the tilting plates according to FIG. 2,

FIG. 4 a top view of the z sensor device of the gyroscope shown in FIG. 1,

FIG. 5 a top view of a z sensor device of the gyroscope according to FIG. 1,

FIG. 6 a sketch of the primary movement of the sensor according to FIG. 1,

FIG. 7 a secondary movement for determining a y rotational speed of the gyroscope according to FIG. 1, and FIG. 8 the determination of a z rotational speed of the gyroscope according to FIG. 1.

The top view of FIG. 1 shows the overview of all components of a micro electro-mechanical gyroscope in accordance with this invention. The figures explain in more detail the individual components as well as the types of oscillation of the gyroscope while rotational speeds are being registered.

The gyroscope consists especially of elements for registering a rotational speed about the x axis and the y axis, which lie on the drawing plane. Further structural groups of the gyroscope lying on this plane refer to the detection of the z rotational speed. Parallel to and below this plane, there is a substrate on which the structural parts shown are arranged, as described below.

Tilting plates 2 are intended for registering the x and y rotational speeds. For determining a z rotational speed (i.e. a rotation of the gyroscope about the z axis) a z mass 3 is essentially placed between two tilting plates 2. The z mass 3 is located in a frame 4 and fastened to it with four springs 5. The frame 4 hangs over two frame springs 6 on two frame tie bolts 7 that are fixed to the substrate.

The tilting plates 2 are on the one hand fastened to the substrate with tilting springs 8 and a tie bolt 9. On the other hand, each tilting plate 2 is held between two frames 4 with two synchronization springs 10.

The tilting plates 2 and the z masses 3 with the frame 4 are set into an oscillating rotational tangential motion about the z axis as an oscillating primary movement. In this example, the drive takes place with the help of two comb electrodes 11 and 11'. Here, the comb electrodes 11 and 11' are fastened to the movable parts, namely the tilting plates 2 and the frame 4, while the corresponding counter electrodes 11' are stationary fixed on the substrate. The application of alternating voltage elicits the mutual attraction of the electrodes 11 and 11' that are on the opposite sides and this causes the tangential oscillation of the tilting plates 2 as well as of the z masses 3 and frame 4 in terms of the primary movement. In order to maintain the oscillating rotation of the individual elements in synchrony and the tilting plates 2 and the frame 4 stable, synchronization springs 10 located between the tilting plates 2 and the frame 4 are intended.

If the gyroscope now starts rotating about the x axis, Coriolis forces occur that make the tilting plates 2 arranged on the x axis to protrude from the x-y plane. Owing to the predetermined elasticity of the tilting springs 8 and the synchronization springs 10, the tilting plates 2 lying on the x axis rotate about the y axis or about the tilting springs 8 into and out of the drawing plane. For this purpose, the tilting springs 8 have been executed in a way to allow, on the one hand, the driving movement of the tilting plates 2 about the z axis and, on the other hand, to not substantially impede the tilting about the y axis. About the x axis, however, the tilting springs 8 are largely rigid on the tilting plates 2 located on the x axis. The same applies to a rotational speed of the gyroscope about the y axis. In this case, the tilting plates 2 located on the y axis tilt out of the x-y plane and indicate the corresponding Coriolis force acting upon the tilting plates 2. The corresponding tilting springs 8 of these tilting plates 2 are executed analogously to the other tilting springs; owing to their arrangement and design, they allow a rotation of the tilting plates 2 positioned on the y axis about the z axis and a tilting movement about the x axis. On the other hand, they have an essentially rigid design about the y axis. The synchronization springs 10 are designed in a way to also allow the tilting movement of the tilting plates 2 out of the x, y drawing plane. However, they pass on the tangential movement about the z axis to the neighboring structural part. Accordingly, they have been designed largely rigid for the forces that act in tangential direction.

The z mass 3 and the frame 4, among other, serve as indicators of the gyroscope's z rotational speed. The primary movement completes itself together with the tilting plates 2 in tangential direction about the z axis too. The drive takes place with comb electrodes 11 and 11', in which case the comb electrodes 11 are arranged on the frame 4, whereas the comb electrodes 11' are stationary fastened on the substrate. The tangential movement about the z axis is supported by the frame springs 6, which allow the tangential movement, but largely impede a radial movement of the frame 4 in this direction owing to their respective rigidity.

Due to the tangential primary movement, Coriolis forces occur in radial direction as soon as the gyroscope rotates about the z axis. The frame 4 cannot yield in radial direction owing to the suspension on the frame springs 6 and the synchronization springs 10. The z mass 3, on the other hand, has been suspended from the frame 4 with its springs 5 in such a way that it can yield in radial direction of the Coriolis force. The springs 5 with which the z mass 3 is fastened to the frame 4 have been set in such a way to each other that z mass 3 is made more insensitive against parasitic rotational torques that occur solely from the primary tangential movement. As a result of this, the z mass 3 reacts essentially only to Coriolis forces that occur due to a rotational speed along the z axis.

To determine the z rotational speed without interference, the z mass 3 is connected to a sensor element 12. This sensor element 12 is fastened to the tie bolt 9 and to two tie bolts 14 with sensor springs 13. In addition, the sensor element 12 is connected to the z mass 3 via a coupling spring 15. The coupling spring 15 is executed non-rigidly in tangential direction and stiffer in radial direction. As a result of this, a decoupling between the drive movement of the z mass in tangential direction and the sensor and secondary movement in radial direction occurs. While the z mass is driven in tangential direction without this having a significant effect on the sensor element 12, when a Coriolis force occurs the z mass 3 is moved outwards and inwards, and while doing so it carries the sensor element 12 due to the corresponding spring stiffness of the coupling spring 15. With respect to their spring stiffness, the sensor springs 13 are likewise executed in such a way that they hardly impede the sensor element 12 in radial direction—in other words, that in this direction they have a relatively low (and in any case precisely adjustable) spring stiffness and at the same time they largely impede the movements of the sensor element 12 in tangential direction. This decouples the primary movement from the secondary movement, so that the sensor element 12 can indicate a Coriolis force occurring in radial direction only through a corresponding oscillating movement in radial direction. The mesh structure of the sensor element 12 thus implements the movable electrode of a capacitor whose static opposite pole is fixed on the substrate within the recesses and not drawn. This variable capacity serves the purpose of converting the registered movement into an electric signal.

For a better understanding, the following figures show the gyroscope's individual elements detached from the other structural elements.

FIG. 2 shows the tilting plates 2. Every tilting plate 2 is fastened to two tie bolts 9 with the help of two tilting springs 8. The tilting springs 8 allow on the one hand the tangential oscillating primary movement of the tilting plates 2 and, on the other hand, they also allow the tilting of the tilting plates 2 out of the x-y plane around the tilting springs 8. In radial direction, on the other hand, the tilting springs 8 have been stiffly executed so that the tilting plates 2 are not significantly deflected by a Coriolis force acting in radial direction that indicates a z rotation of the gyroscope. Therefore, a predetermined deflection of the tilting plates 2 occurs due to a rotational speed about the x or y axis.

According to FIG. 3, the tilting plates 2 of FIG. 2 are connected with the frame 4 and synchronization springs 10. The unit shown here is set into a synchronous tangential motion about the z axis as primary movement. The connecting springs 10 synchronize the tangential movement of the tilting plates 2 and the frame 4. Speed differences among the components, which could possibly occur owing to tolerances in the production of the gyroscope, are offset by the synchronization springs 10. The individual structural parts thus oscillate with a common resonance frequency and therefore indicate rotational speeds in the same way.

FIG. 4 shows the structural parts that are essential for registering a z rotational speed. In the primary movement, the z mass 3 is set into an oscillating tangential motion about the z axis together with the frame 4 (not shown here). Reacting to the gyroscope's rotation about the z axis, the z mass 3 is stimulated to a radial oscillation. The z mass 3 is connected to the sensor element 12 via the coupling spring 15. Sensor springs 13 fasten the sensor element 12 to the tie bolts 9 and 14. The sensor springs 13 allow the sensor element 12 to make a radial movement, which during the course of registering a rotational speed about the z axis is coupled by the radial oscillation of the z mass 3. The transfer of the radial movement from the z mass 3 to the sensor element 12 is made possible by the coupling spring 15, which is on the one hand sufficiently non-rigid for not transferring the tangential primary movement of the z mass 3 to the sensor element 12 and on the other hand sufficiently rigid to make the secondary movement of the z mass 3 a radial movement of the sensor element 12. Four of the corresponding structural parts have been arranged on the gyroscope's substrate at a 90-degree angle to one another. Here, they are located between the x and y axis on the median line.

A detailed view of the structural elements for determining the z rotational speed is shown once again in FIG. 5. The z mass 3 is fastened to the frame 4 with springs 5. The frame 4 is fastened to the frame tie bolt 7 via the frame springs 6 that are non-rigid in tangential direction. Apart from being fastened to the tie bolt 9, the sensor element 12 is also arranged on the tie bolts 14. These tie bolts 14 can, in addition to their function as fixation points for springs 13, also serve as stoppers for the primary movement of the frame 4 and the tilting plates 2 too. The radial movement of the z mass 3 is transferred via the coupling spring 15 to the sensor element 12, which is also set into a radial oscillating motion together with the z mass 3 as soon as a Coriolis force indicates a z rotational speed.

FIG. 6 shows a schematic view of the gyroscope's primary movement. It becomes apparent that the tilting plates 2 and the frames 4 are set into an oscillating rotation about the z axis with the z masses 3. In this case, the tie bolts 14 serve as stoppers of the tilting plates 2 and the frame 4. In this primary movement, the sensor elements 12 remain arranged on the substrate without moving. The drawing is schematic as in the following figures, which is why the details can be a little inaccurate.

FIG. 7 shows the deflection of the tilting plates 2 located on the x axis, and this deflection indicates the gyroscope's x rotational speed. The tilting plates 2 located on the x axis are tilted out of the x-y plane around the tilting springs 8 with which they are fastened to the tie bolts 9. The tilting elements 2 located on the y axis, on the other hand, remain on this plane. Owing to the spring stiffness of the synchronization springs 10, the frames 4 and the z masses 3 are also tilted in this embodiment, but due to the softness of the coupling springs 15, these deflections do not disrupt the sensor element 12. Thanks to plate capacitors (whose movable one-half is formed by the tilting plate 2 itself) and their static one-half located below the allocated tilting plate 2 on the substrate, the respective tilting movements can be converted to an electric signal. Due to the softness of the coupling springs 15, these movements have no effect on the sensor elements 12. Similarly, a y rotational speed can be registered. In this case, the tilting plates 2 (which are arranged along the y axis) tilt out of the x-y plane. If applicable, as a result of this, the z masses 3 and the frames 4 (which are fastened to the tilting plates 2 via the synchronization springs 10) are also moved out of the x-y plane, at least partially.

FIG. 8 shows a schematic view of how a gyroscope's z rotational speed is registered. Here, the Coriolis force sets the z masses 3 into oscillating motions going in radial direction, as already described above. In this movement of the z mass 3, the coupling spring 15 causes the sensor element 12 to move in radially oscillating fashion too. The corresponding springs are designed so the sensor element 12 can be moved slightly in radial direction, but stay rigid in a direction out of the x-y plane or in tangential direction about the z axis. The radial movement of the sensor element 12 can be determined on its mesh structure with the corresponding electrodes that are fastened in stationary fashion on the substrate. For registering the z rotational speed, both the tilting plates 2 and the frame 4 remain largely rigid. If need be, however, and depending on the respective spring constants, the frame 4 can be slightly deflected in radial direction.

This invention is not restricted to the embodiments shown. In particular, modifications such as the design of the individual structural parts and their mutual arrangement are possible in a manner different from the one shown here, as far as they remain within the framework of the applicable patent claims.

REFERENCE LIST

1 Substrate
2 Tilting plate
3 z mass
4 Frame
5 Spring
6 Frame spring
7 Frame tie bolt
8 Tilting spring
9 Tie bolt
10 Synchronization spring
11 Comb electrode
11' Counter electrode
12 Sensor element
13 Sensor spring
14 Tie bolt
15 Coupling spring

The invention claimed is:

1. A micro gyroscope to determine rotational movements about three perpendicularly stacked spatial axes x, y and z, the gyroscope comprising:
    a substrate on which several tangentially oscillating masses are arranged about the z axis that is perpendicularly positioned on the substrate, the oscillating masses are fastened to the substrate with springs and tie bolts;
    drive elements to maintain oscillating tangential vibrations of the masses about the z axis, as a result of which the masses are subject to Coriolis forces and the deflections caused by the Coriolis forces when the substrate rotates around any spatial axis; and
    sensor elements to register the deflection of the masses caused by the Coriolis forces,
    wherein some of the masses oscillating about the z axis are tiltably arranged about the x axis that runs parallel to the substrate, other masses oscillating about the z axis are essentially tiltably arranged about the y axis that runs parallel to the substrate, and at least one of the oscillating masses can be also be deflected at least partially radially with respect to the z axis in the x-y plane parallel to the plane of the substrate, this z mass can be additionally deflected radially and is allocated to an oscillating sensor element that can also be deflected radially with regard to the z axis but not about the z axis.

* * * * *